MAGNETIC SHUNTING RECORDER

Filed April 3, 1964 2 Sheets-Sheet 1

INVENTORS
Eugene Leonard
Edgar Wolf
Francis C. Marino
Wolfgang F. Heine
BY
ATTORNEYS

MAGNETIC SHUNTING RECORDER

Filed April 3, 1964 2 Sheets-Sheet 2

United States Patent Office 3,401,394

Patented Sept. 10, 1968

3,401,394

MAGNETIC SHUNTING RECORDER

Eugene Leonard, Sands Point, Edgar Wolf, New Hyde Park, Francis C. Marino, Huntington, and Wolfgang F. Heine, Huntington Station, N.Y., assignors to Digitronics Corporation, Albertson, N.Y., a corporation of Delaware Filed Apr. 3, 1964, Ser. No. 357,085
8 Claims. (Cl. 346—74)

ABSTRACT OF THE DISCLOSURE

An information recording apparatus which records fixed and variable data on a magnetic tape and simultaneously prints "hard copy" in visual form on a record form. The fixed data is represented by first magnetic shunting elements in a laminar record medium. The variable data is represented by a carrier of second magnetic shunting elements that is selectively movable over the magnetic tape. When the fixed and variable data magnetic shunting elements are in place a permanent magnet is moved over to the elements and the tape to cause the recording. In addition associated with the permanent magnet is a pressure roller which presses portions of the laminar record medium and the carrier having bosses thereon to cause an impression recording on a visual record form.

The present invention relates to apparatus for recording discrete or digital information on record media and more particularly for recording fixed as well as variable information on record media.

Discrete or digital data can be recorded on many types of record media such as: paper or the like where visible recordings of symbols by printing or impression techniques are employed; and magnetic recordings on a magnetizable medium wherein recordings are made by the influence of a magnetic field on portions of the magnetizable medium.

In particular, discrete or digital magnetic recording contemplates a recording process wherein predetermined stable states of magnetization in a magnetizable record medium represent specific values or units of information. Generally, one stable state of magnetization is employed to represent a binary "1" and another stable state is employed to represent binary "0." The stable states usually can be classified as positive magnetization, negative magnetization or neutral magnetization. It should be apparent that only any two of the three states are required to represent the two possible values of a binary unit (bit) of information. Although it is possible to employ the neutral state and either of the other states it is preferable for signal discrimination reasons to use the positive and negative states.

In any event, data processing systems employ digital magnetic recordings in their input, output and, particularly, storage organs. While digital magnetic recording techniques with respect to working and backup memories of digital computers employing "on the fly" magnetic recordings have reached a high degree of sophistication, there is still not available a simple, inexpensive means for providing static or quasi-static magnetic recordings which are utilizable in manually operable input devices.

One such class of input devices can be termed a "point-of-transaction" recorder. Such recorders are widely used at present in credit card systems. Other applications concern the processing of information on attendance badges, tub file cards, roll charts, etc. For the sake of concreteness only credit card systems will be discussed since they are a striking example of a system having its weak link at the input end of the system. In a typical credit card system, the credit card serves as a "stencil" for supplying fixed information usually by the printing of embossed characters on a record medium. The variable information, i.e., the amount of the transaction is usually hand written on the record medium. The record medium is then forwarded to an operator who converts the information recorded on the record medium into machine readable language generally by key punching perforable cards or tapes which are fed to the processing part of the system. Thus, there is considerable human labor and expense involved in getting the information from the point of transaction into the processor.

Many attempts have been made employing mechanical perforations and the like at the point of transaction. However, such devices are, generally, too complex and expensive for the average point of transaction such as a gasoline station. Attempts have also been made to employ magnetic recording techniques. However, these attempts either required "on the fly" processes or, if static, required complex apparatus usually entailing a source of electrical energy or very special record media. Furthermore, since many of the point-of-transaction input devices are subject to environmental abuses they must employ simple and non-critical components.

In determining the type of point-of-transaction input device to be employed in a system, one must consider which of the many forms of information representation is most advantageous for entry into the processor. Since most high speed data processors today are designed to work with magnetic tape units as gross input devices, it is advantageous to employ magnetic recordings in the point-of-transaction input devices.

It is accordingly an object of the invention to provide an improved magnetic recording apparatus.

It is another object of the invention to provide an improved manually operable magnetic recording apparatus.

It is a further object of the invention to provide simple and inexpensive magnetic recording apparatus which while being relatively immune to abuse provides reliable record media suitable for direct high-speed input into a data processor.

Yet another object of the invention is to provide simple and inexpensive magnetic recording apparatus which permits the recording of both fixed and variable information on a magnetizable medium.

Briefly, the invention contemplates apparatus for magnetically recording on a magnetizable medium having a predetermined state of magnetization through the agency of a laminar record medium which carries magnetic shunting means representing fixed data. The apparatus includes means for supporting the magnetizable medium and means for supporting the laminar record medium with its magnetic shunting means representing the fixed data in close proximity to a first portion of the magnetizable medium so that the magnetic shunting means magnetically shunts distinct areas of the first portion of the magnetizable medium. The apparatus also includes a variable data source means which has a plurality of different magnetic shunting means each of which represents different data. Means are provided for selectively positioning one of the plurality of different magnetic shunting means in close proximity to a second portion of the magnetizable medium so that distinct areas of the second portion are magnetically shunted. A source of a magnetic field is also provided. The strength of the magnetic field is such that it can establish a different state of magnetization only in the unshunted portions of the magnetic field when the magnetizable medium is subjected to influence of the magnetic field.

The source of the magnetic field is guided across the first and second portions of the magnetizable medium so that the fixed data on the laminar record medium and the selected variable data on the variable data source means are recorded on the magnetizable medium.

Although such apparatus can provide a machine readable record, it is desirable to also provide a visual record. Such is the case, for example, in credit card systems where the customer desires a receipt. Furthermore, if the vendor sends the magnetizable medium to a remote office for data processing, he also might want a receipt for his records.

It is accordingly a feature of the invention to provide apparatus which simultaneously produces a magnetically recorded record medium and a record medium having visible indicia.

Other objects, features and advantages of the invention will be pointed out in the following detailed description and claims, and illustrated in the accompanying drawings, which show, by way of example, and not limitation, the principle of the invention and preferred modes for applying that principle.

Figure 1:
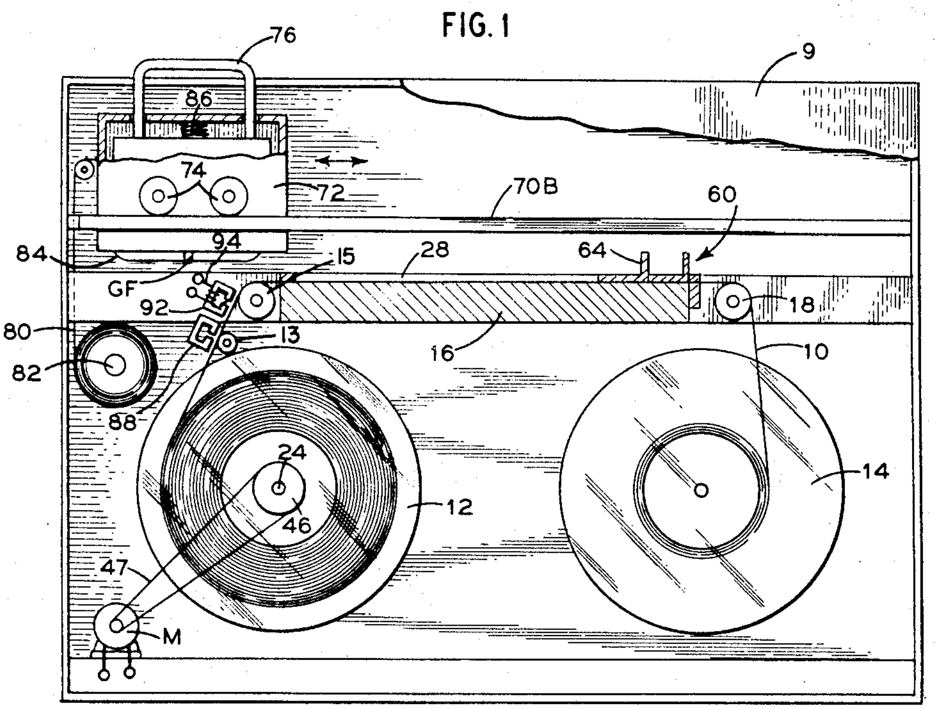
FIG. 1 is a side view, partially in section, with the cover broken away, of apparatus for magnetically recording both fixed and variable data.
Figures 2, 3, 4:
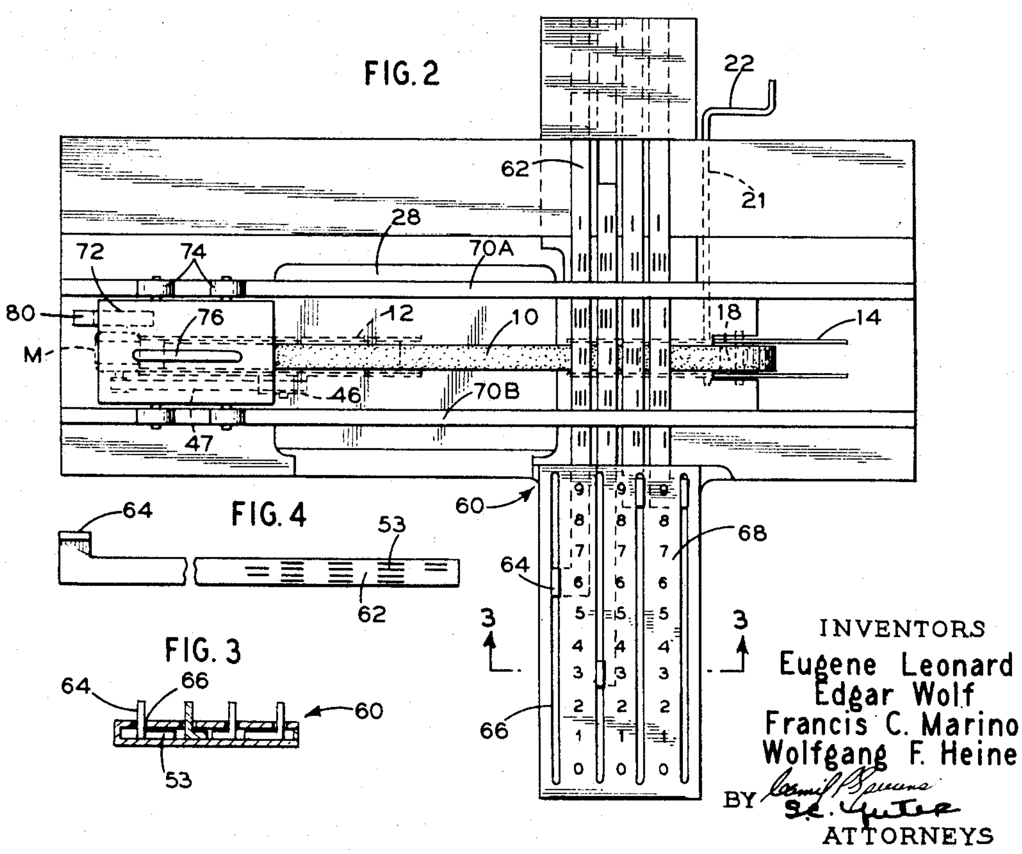
FIG. 2 is a top view, with the top of the cover removed, of the apparatus of FIG. 1.
FIG. 3 is a sectional view of the variable data input means taken along the lines 3—3 of FIG. 2.
FIG. 4 is a plan view of one of the variable data sources of the apparatus of FIG. 2.

A point of transaction input device is shown in FIGS. 1 and 2 comprising a housing 9. Mounted in housing 9 is a transport mechanism for a magnetic tape 10 (magnetizable medium) comprising a rotatably mounted supply reel 12 and a rotatably mounted takeup reel 14, a tape guide 16 (means for supporting the magnetizable medium) and an idler pulley 18. Takeup reel 14 is connected to axle 21 which has a crank 22 connected thereto. Supply reel 12 is connected to axle 24 which is connected to pulley 46; a belt 47 connects pulley 46 to motor M. When motor M is not energized it supplies drag for supply reel 12.

Magnetic tape 10 moves from supply reel 12 over idler pulleys 13 and 15 through tape guide 16 and over idler pulley 18 to takeup reel 14 in response to manual rotation of crank 22. Included in tape guide 16 is a transversely grooved region 28 (means for supporting a laminar record medium) for accommodating stencil 50 (FIGS. 5 and 6) which may be a credit card. When stencil 50 is in place it rests on magnetic tape 10. Stencil 50 carries the fixed information in the form of elements 52 of magnetically soft material as will be hereinafter described.

The right hand portion of the tape guide 16 is adjacent to a variable information input station 60 (variable data source). Variable input station 60 includes, by way of example, four strips 62 (FIG. 4) which are suitably guided (FIG. 3) to be moved transverse to magnetic tape 10. Each strip 62 is of a non-magnetic material with coded combinations of elements 53 similar to elements 52 affixed thereto. The end of each strip 62 remote from element 53 has an upwardly extending tab 64. Tab 64 extends upwardly through slots 66 in an indexed housing 68. The index numbers on housing 68 are related to the coded combinations of elements 53 lying over magnetic tape 10. Accordingly, an operator by aligning the tabs 64 with selected index numbers can present variable information for recording on magnetic tape 10.

Disposed above tape guide 16 are a pair of horizontally displaced tracks 70A and 70B for guiding a magnet carriage 72. Rotatably connected to magnet carriage 72 are wheels 74 which roll on tracks 70. Extending from the top of magnet carriage 72 is a handle 76 which passes through a longitudinal slot in the top of housing 9.

Handle 76 is provided to permit an operator to move magnetic carriage 72 longitudinally from left to right. Connected to magnet carriage 72 is a belt 80 which is wrapped around a spring biased reel 82 so that when the carriage 72 is released when in the rightmost position it is drawn back to the leftmost position. Extending from the bottom of magnet carriage 72 is the active portion of magnet 84 with front gap GF. Spring 86 biases magnet 84 in a retracted position. When pressure is applied to handle 76 magnet 84 is urged downward so that as magnet carriage 72 is moved along tracks 70 front gap GF moves past the portion of the magnet tape 10 in tape guide 16 as well as the portion of stencil 50 and the portion of strips 62 over magnetic tape 10. When magnet 84 is in the downward position the distance of gap GF from stencil 50 when in position and strips 62 are sufficient for the magnetic flux from magnet 84 to influence the state of magnetization of magnetic tape 10, say, longitudinally magnetizing it to saturation from right to left.

An initial prebiasing magnet 88 is positioned opposite magnetic tape 10 in the region between the feed reel 12 and the tape guide 16. Accordingly, as magnetic tape 10 moves past magnet 88 it is prebiased to one state of magnetization, say, longitudinally from left to right.

Initially, crank 22 is turned to draw an unused portion of magnetic tape 10 onto tape guide 16.

The operator then inserts stencil 50 into region 28 and positions the tabs 64 opposite the desired index numbers. The magnet carriage 72 is then moved by the operator from left to right while pressing down on handle 76. All portions of magnetic tape 10 not "in the shadow" of elements 52 of stencil 50 and elements 53 of strips 62 are longitudinally magnetized to saturation from right to left while the "shadowed" portions of magnetic tape 10 remains longitudinally magnetized to saturation from left to right as is hereinafter more fully described. When the operator releases handle 76 magnet 84 retracts to a position wherein its magnetic field can no longer influence magnetic tape 10 and carriage 72 is pulled to the left by tape 80 and spring biased reel 82. The operator then merely turns crank 22 to take-up the portion of the magnetic tape 10 upon which the recording was made and to present a new portion of tape preparatory to a new recording operation.

At a later time, the reels 12 and 14 can be removed. The takeup reel 14 can be shipped to a central station for processing. The empty supply reel 12 positioned to become the new takeup reel and another reel of magnetic tape substituted for the spent supply reel.

However, it is possible for the apparatus to directly transmit the recorded information to the central station. There may accordingly be provided a reproducing head 92 positioned opposite magnetic tape 10 between prebiasing magnet 88 and tape guide 16. The winding 94 of head 92 can be connected by well-known communication circuits to the central station.

After the recordings have been made and the magnetic tape 10 is on takeup reel 14, motor 17 is energized and tape 10 is rewound onto supply reel 12. As the magnetic tape 10 moves past reproducing head 92, the recordings thereon are converted to electrical signals representing the recorded data.

Figure 5:
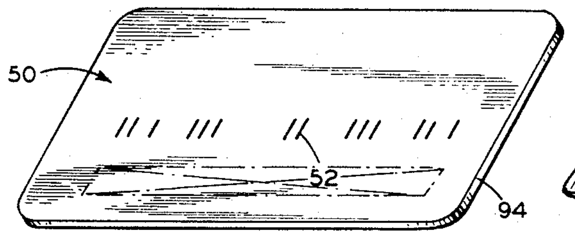
FIG. 5 shows a top view of a stencil having ferromagnetic elements representing fixed data used in magnetic recording in accordance with the invention.
Figure 6:
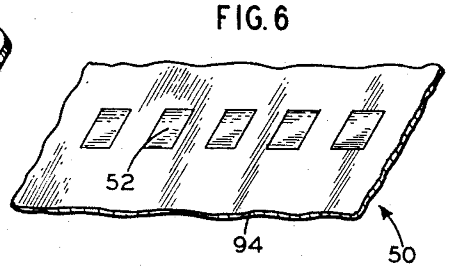
FIG. 6 is an expanded fragmentary view of the stencil of FIG. 5 showing the ferromagnetic elements in greater detail.

In FIGS. 5 and 6 there is shown the details of a stencil 50 which supplies the fixed data for magnetic recording. The stencil 50 includes a laminar base 94 of preferably semirigid nonmagnetic material. Affixed to the base 94 by adhesion or imbedding and adhesion are elements 52 of a magnetically soft ferromagnetic material such as Mu metal. Mu metal is composed of: 74 parts of nickel; 20 parts of iron; 5 parts of copper; and 1 part of manganese. Other magnetically soft materials with relatively high intrinsic saturation flux density and relatively low coercivity, i.e., less than 3 oersteds, can also be employed. The planar shape of elements 52 will determine the shape of the recorded areas. In the exemplary embodiments of FIGS. 5 and 6, bar shaped elements are used since the recording desired is a series of longitudinally displaced transverse lines on a magnetic tape wherein the series are to be transduced as coded combinations of information bits. It should be noted that there can be a second series representing sprockets. It also should be noted that the elements could be in the shape of characters and particularly of the shape adopted by the American Banking Association for checks. Furthermore, it is possible to use stencils that are entirely of magnetically soft material with holes therein representing the data.

For mechanical safety reasons, a thin sheetlike overlay nonmagnetic material can cover the elements 52. Such an overlay is used partially to protect elements 52 as well as to prevent the scratching of the magnetic coating of the magnetic tape 10 against which the stencil 50 is placed.

Figure 7:
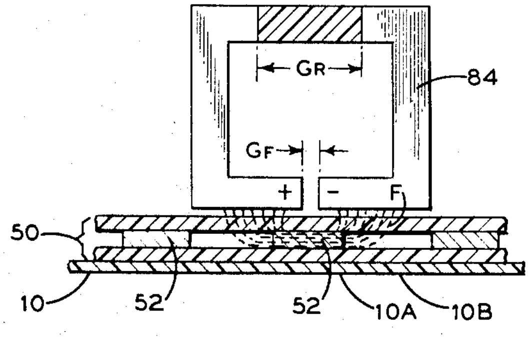
FIG. 7 shows a sectional view of apparatus for explaining the magnetic recording phenomena employed by the apparatus of the invention.

The theory of the magnetic recording process will now be described with respect to FIG. 7. There are three components involved: permanent magnet 84 (source of a magnetic field); stencil 50 including elements 52 of Mu metal; and magnetic tape 10 (magnetizable medium). Magnet 84 may be a pair of C shaped Alnico cores abutted together with a front gap GF and a rear gap GR. Although abutting C shaped cores are shown, it should be apparent that other shapes such as bar magnets or even electromagnets could be employed. The size of magnet 84 with respect to its gaps is distorted in FIG. 7 so that the drawings do not become excessively large.

Initially, magnetic tape 10 can be unmagnetized, i.e., in the neutral stable state of magnetization. The stencil 50 is then placed against magnetic tape 10. In FIG. 7 stencil 50 is placed on top of magnetic tape 10. However, it could equally well be placed below the tape. Accordingly, elements 52 are positioned in close proximity to the magnetizable medium or magnetic tape 10. Magnet 84 is then moved from, say, left to right across stencil 50, i.e., the source of a magnetic field is placed in close proximity to the magnetizable medium (magnetic tape 10) and elements 52 of Mu metal (magnetically soft material). This movement will change the state of magnetization of those portions of the magnetic tape 10 remote from (not "in the shadow of") elements 52 to another stable state while leaving the state of magnetization of the portions in close proximity, i.e., under elements 52 in FIG. 7, unchanged. There are now magnetization discontinuities in the tape 10. These discontinuities represent the information that has been recorded.

The amplitude of these discontinuities can readily be doubled. The magnetization in magnetic tape 10 is first saturated in one direction, say, negatively, by a magnet such as magnet 88 of FIG. 1; in other words as magnetic tape 10 moves past magnet 88 it will be longitudinally saturated in one direction. Then, with the elements 52 in place, magnet 84 or other suitable source of a magnetic field is longitudinally moved across tape 10. The direction of the magnetic-field of magnet 84 is oriented to longitudinally saturate the magnetic tape 10 in the opposite direction.

What is believed to be the phenomena involved will now be described with reference to FIG. 7. In FIG. 7 the magnetic flux fringing from gap GF represented by the dotted lines F passes from the positive pole (+) of magnet 84 via the air gap and is almost completely shunted by element 52 past the portion 10A of magnetic tape 10, and back via the air gap to the negative pole (−) of magnet 84. When a portion of magnetic tape 10 such as portion 10B is under gap GF the flux lines F leaving positive pole (+) pass through the air gap, enter the tape 10, pass longitudinally therethrough and leave magnetic tape 10, and pass through the air gap to the negative pole (−). Hence, a portion 10A is uninfluenced by the fringing flux while a portion such as 10B is influenced. In other words, the element 52 shunts the field so that the portion 10A is bypassed. Accordingly, if magnetic tape 10 is initially unmagnetized, portion 10A remains unmagnetized and portion 10B is longitudinally magnetized from right to left. If magnetic tape 10 were initially magnetized longitudinally from left to right, portion 10A remains longitudinally magnetized from left to right and portion 10B is longitudinally magnetized from right to left.

Therefore, it should be apparent that the role of element 52 is to maintain by a shunting action the state of magnetization of the portion of magnetic tape 10, which it neighbors, unchanged, when influenced by a magnetic field. In other words, element 52 acts as a magnetic shunt. In this respect it has been found that for good results the element 52 should not magnetically saturate when under the influence of the magnetic field, but the magnetic field should change the state of magnetization of unshunted portions of the magnetic tape 10. Accordingly, the strength of the magnetic field in the region of element 52 is generally controlled by the air gap between the magnet 84 and the element 52.

In other words, the strength of the field should be strong enough to affect magnetic tape 10 but not too strong so as to magnetically saturate elements 52, or the saturation flux density of elements 52 should be great enough so that elements 52 are not magnetically saturated by a magnetic field passing therethrough.

Figure 8:
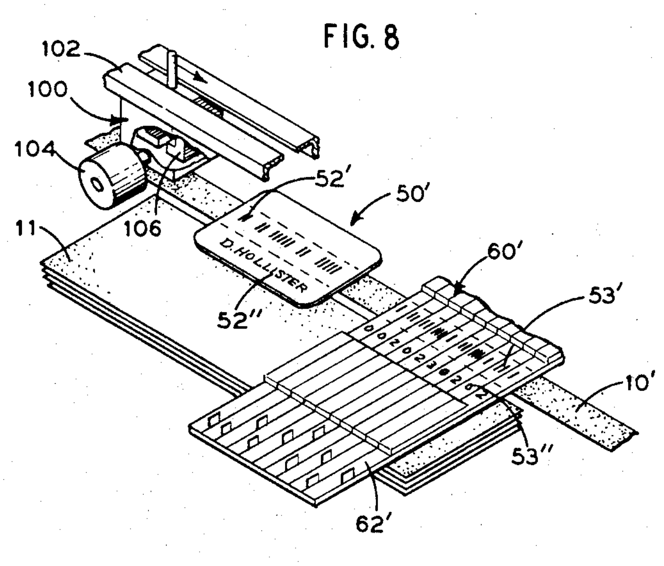
FIG. 8 is a perspective view of apparatus for simultaneously recording magnetically and visually data in accordance with a feature of the invention.

Referring now to FIG. 8, there is shown apparatus which permits the simultaneous recording of magnetic indicia and visual indicia. In particular, a magnetic tape 10' and pressure sensitive record medium 11 are supported side by side. The pressure sensitive record medium 11 can be multisheet forms interleaved with carbon paper or could be sheets of what is known as "carbonless-carbon" paper. Supported on one portion of magnetic tape 10' and medium 11 is a stencil 50' of nonmagnetic material having elements 52' similar to the previously described elements 52. These elements are positioned over magnetic tape 10'. Also included on stencil 50' are embossed symbols 52'' positioned over impression sensitive record medium 11. There is a given information relationship between the elements 52' and the embossed symbols 52''. In particular, each combination of elements 52' represent one of the symbols 52''.

Stencil 50' includes the fixed information to be recorded. The variable information is supplied by variable data source 60' which is identical to variable data source 60 of FIGS. 1 to 4 except that the strips 62' carry, in addition to elements 53' similar to elements 53, embossed regions 53'' representing visible data. There is a one-to-one correspondence between elements 53' and embossed region 53'', i.e. one coded combination of elements 53' represent the visible symbol of the associated embossed region 53''.

Recordings are made on both media simultaneous by recording member 100 which is guided by slotted channel 102 to move across both stencil 50' and variable data source 60'. Recording member 100 includes permanent magnet 106 and pressure roller 104. Magnet 106 traverses a path which moves over elements 52' and 53' causing the magnetic recording of the information represented by these elements on magnet tape 10' as previously described. At the same time, pressure roller 104 traverses a path which moves over elements 52'' and 53'' causing impressions to be made on impression sensitive record medium 11, which by virtue of the material become visible indicia on the medium. Accordingly, a visible record is made which can be used as a receipt at the same time a magnetic record is made on a magnetizable medium which can be sent to a central office for processing.

There has, therefore, been shown apparatus which can simultaneously record variable and fixed information on a magnetizable medium by means of employing magnetic shunting elements in fixed combinations representing fixed data and in selectable combinations representing variable data to shunt portions of the magnetizable medium from a magnetic field.

In addition, there has been shown apparatus for producing simultaneously both records on a magnetizable medium and visual records on an impression sensitive medium.

While only a limited number of embodiments of the invention have been shown and described in detail there will now be obvious to those skilled in the art many modifications and variations which satisfy many or all of the objects of the invention but which do not depart from the spirit of the invention as defined by the appended claims.

What is claimed is:

1. Apparatus for magnetically recording fixed and variable data on a magnetizable medium having a predetermined state of magnetization with a laminar record medium including first magnetic shunting means representing fixed data comprising: means for supporting said magnetizable medium; means for supporting said laminar record medium including said first magnetic shunting means representing the fixed data in close proximity to a first portion of said magnetizable medium for magnetically shunting distinct areas of said magnetizable medium; variable data source means including in a unitary element a plurality of second magnetic shunting means each of said plurality of second magnetic shunting means representing a different datum of a set of data and means for moving said unitary element to selectively position one of said plurality of second magnetic shunting means in close proximity to a second portion of said magnetizable medium for magnetically shunting distinct areas of said magnetizable medium; a source of a magnetic field having a strength sufficient to establish a different state of magnetization only in the unshunted portions of the magnetizable medium; and means for guiding said source of magnetic field across said first and second portions of said magnetizable medium.

2. Apparatus for magnetically recording on a magnetic tape having a predetermined state of magnetization comprising: magnetic tape supporting means for supporting a given length of magnetic tape in a given position; a laminar record medium including first magnetic shunting means representing fixed data; means for supporting said laminar record medium in close proximity to a first portion of said length of magnetic tape for magnetically shunting distinct areas of said first portion; variable data source means distinct from said laminar record medium, said variable data source means including a plurality of second magnetic shunting means each of said second magnetic shunting means representing a different datum of a set of data and means for selectively positioning one of said plurality of second magnetic shunting means in close proximity to a second portion of said length of magnetic tape for magnetically shunting distinct areas of said second portion; a movable source of a magnetic field having a strength sufficient to establish a different state of magnetization only in the unshunted portions of the magnetic tape; means for guiding said movable source of a magnetic field across said first and second portions of said length of magnetic tape; and means for moving successive lengths of said magnetic tape to said magnetic tape supporting means.

3. The apparatus of claim 2 wherein said variable data source means includes a striplike element of non-magnetic material, a plurality of second magnetic shunting means, each of said plurality representing a different datum of a set of data, longitudinally positioned along said striplike element; means for guiding said striplike element transversely across said magnetic tape support means, and means for indicating which portion of said striplike element is opposite said magnetic tape support means.

4. Apparatus for magnetically recording on magnetic tape comprising a supply reel for magnetic tape, a takeup reel for magnetic tape displaced from said supply reel, a magnetic tape guiding means for supporting a length of magnetic tape in an extended flat position, said guiding means being positioned between said reels whereby magnetic tape can travel from said supply reel via said guiding means to said takeup reel, a fixed source of a magnetic field disposed between said supply reel and said guiding means for establishing a first state of magnetization in the magnetic tape which moves from said supply reel to said guiding means; a laminar record medium including first magnetic shunting means representing fixed data; means for supporting said laminar record medium in close proximity to a first portion of said length of magnetic tape for magnetically shunting distinct areas of said first portion; variable data source means distinct and remote from said laminar record medium including a plurality of second magnetic shunting means, each of said second magnetic shunting means representing a different datum of a set of data and means for selectively positioning one of said plurality of second magnetic shunting means in close proximity to a second portion of said length of magnetic tape for magnetically shunting areas of said second portion; a movable source of a magnetic field having a strength sufficient to establish a different state of magnetization only in the unshunted portion of the magnetic tape; means for guiding said movable source of a magnetic field across said first and second portions of said length of magnetic tape; and means for moving successive lengths of said magnetic tape to said magnetic tape supporting means.

5. The apparatus of claim 4 further including a magnetic reproducing head disposed between said first source of magnetic field and said guiding means opposite the path of travel of said magnetic tape, and means for driving said magnetic tape from said takeup reel to said supply reel whereby magnetically recorded data is reproduced by said magnetic reproducing head.

6. Apparatus for magnetically recording on magnetic tape comprising a supply reel for magnetic tape, a takeup reel for magnetic tape displaced from said supply reel, a magnetic tape guiding means for supporting a length of magnetic tape in an extended flat position, said guiding means being positioned between said reels whereby magnetic tape can travel from said supply reel via said guiding means to said takeup reel, a fixed source of a magnetic field disposed between said supply reel and said guiding means for establishing a first state of magnetization in the magnetic tape which moves from said supply reel to said guiding means; a plurality of striplike elements, each of said elements including first magnetic shunting means representing data longitudinally disposed along each of said striplike elements, means for guiding each of said striplike elements independently and in parallel transversely across a first portion of said length of magnetic tape, means for indicating which portion of each of said striplike elements is opposite said first portion of said length of magnetic tape, a laminar record medium including second magnetic shunting means representing fixed data, means for supporting said laminar record medium in close proximity to a second portion of said length of magnetic tape for magnetically shunting distinct areas of said second portion; a movable source of a magnetic field having a strength sufficient to establish a different state of magnetization in the unshunted portions of said length of magnetic tape; means for guiding said movable source of a magnetic field across said first and second portion of said length of magnetic tape; and means associated with said takeup reel for drawing successive lengths of said magnetic tape onto said tape guiding means.

7. Apparatus for simultaneously recording magnetically on a magnetizable medium having a predetermined state of magnetization and recording visible data on a pressure sensitive record medium with a laminar record medium including first magnetic fluxing influencing elements representing fixed data and embossed symbols representing equivalent data comprising means for supporting said magnetizable medium, means for supporting said pressure sensitive record medium adjacent said magnetizable medium, means for supporting said laminar record medium against both said magnetizable record medium and said pressure sensitive record medium with the magnetic elements opposite said magnetizable medium and said embossed symbols opposite said pressure sensitive record medium, at least one striplike member, a plurality of second magnetic fluxing influencing elements, each of said second magnetic flux influencing elements representing a different datum of a set of data longitudinally disposed along said striplike member, a plurality of embossed symbols representing said set of data, each of said symbols, respectively related to said second magnetic flux influencing elements, being longitudinally disposed along said striplike member, means for guiding said striplike member transversely across said magnetizable medium and said pressure sensitive record medium, a recording means comprising a source of a magnetic field and a pressure roller means adjacently connected to each other, and means for guiding said recording means longitudinally over said magnetizable medium and said pressure sensitive record medium with said source of a magnetic field being guided opposite said magnetizable medium and said pressure roller means being guided opposite said pressure sensitive record medium whereby the embossments of said laminar record medium and said striplike member opposite said pressure sensitive record medium are pressed against the latter and the areas of said magnetizable medium opposite the magnetic flux influencing elements of said laminar record medium and said striplike element are magnetized to a different state of magnetization.

8. The apparatus of claim 7 wherein said magnetic flux influencing elements are magnetic shunting elements and said magnetic field has a strength sufficient to change the state of magnetization of only the unshunted portions of said magnetizable medium.

References Cited

UNITED STATES PATENTS

| | | | |
|---|---|---|---|
| 2,921,142 | 1/1960 | Tinus | 346—74 |
| 3,037,093 | 5/1962 | Nowlan | 179—100.1 |
| 3,075,194 | 1/1963 | Gray | 346—74 |
| 3,146,455 | 8/1964 | Cutaia | 346—74 |

BERNARD KONICK, *Primary Examiner.*

L. J. SCHROEDER, *Assistant Examiner.*